March 14, 1950   F. BÄNNINGER   2,500,735
DEVICE FOR HOLDING AND SHAPING LONG TAPERING STOCK
Original Filed Oct. 26, 1945   2 Sheets-Sheet 1
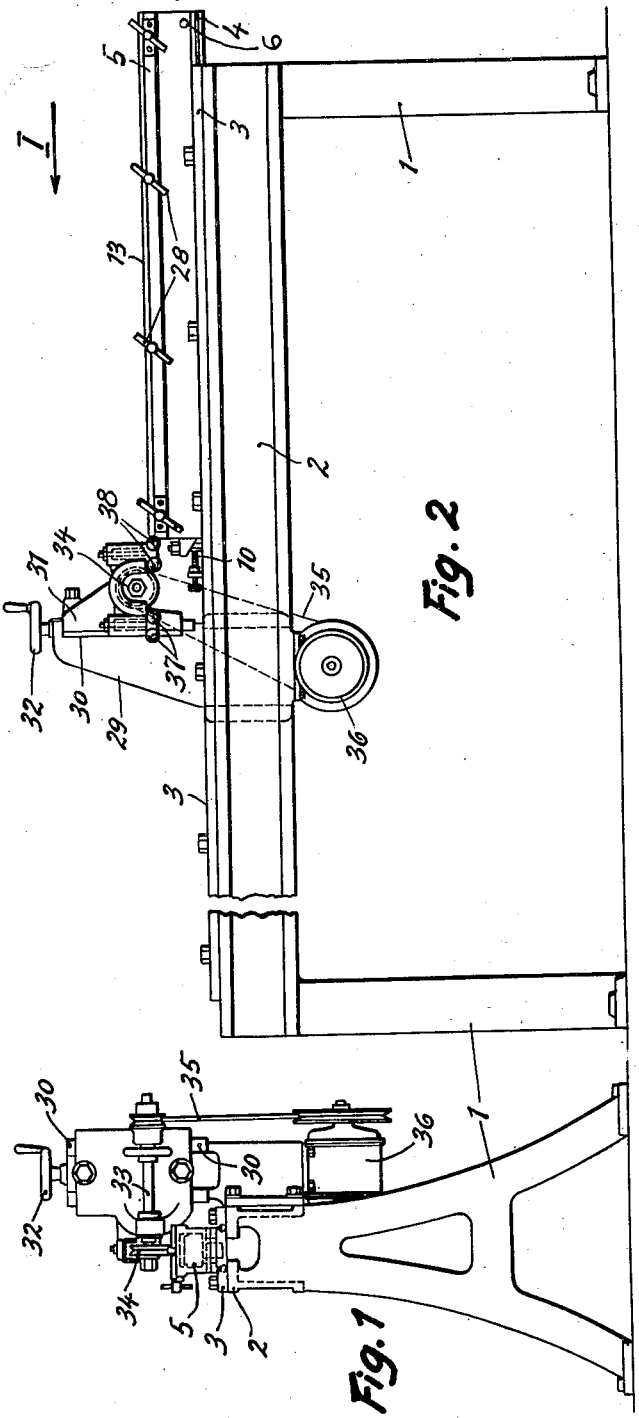
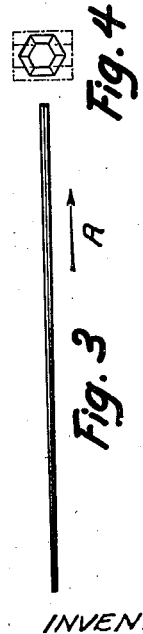
INVENTOR:
Fritz Bänninger March 14, 1950  F. BÄNNINGER  2,500,735
DEVICE FOR HOLDING AND SHAPING LONG TAPERING STOCK
Original Filed Oct. 26, 1945  2 Sheets-Sheet 2
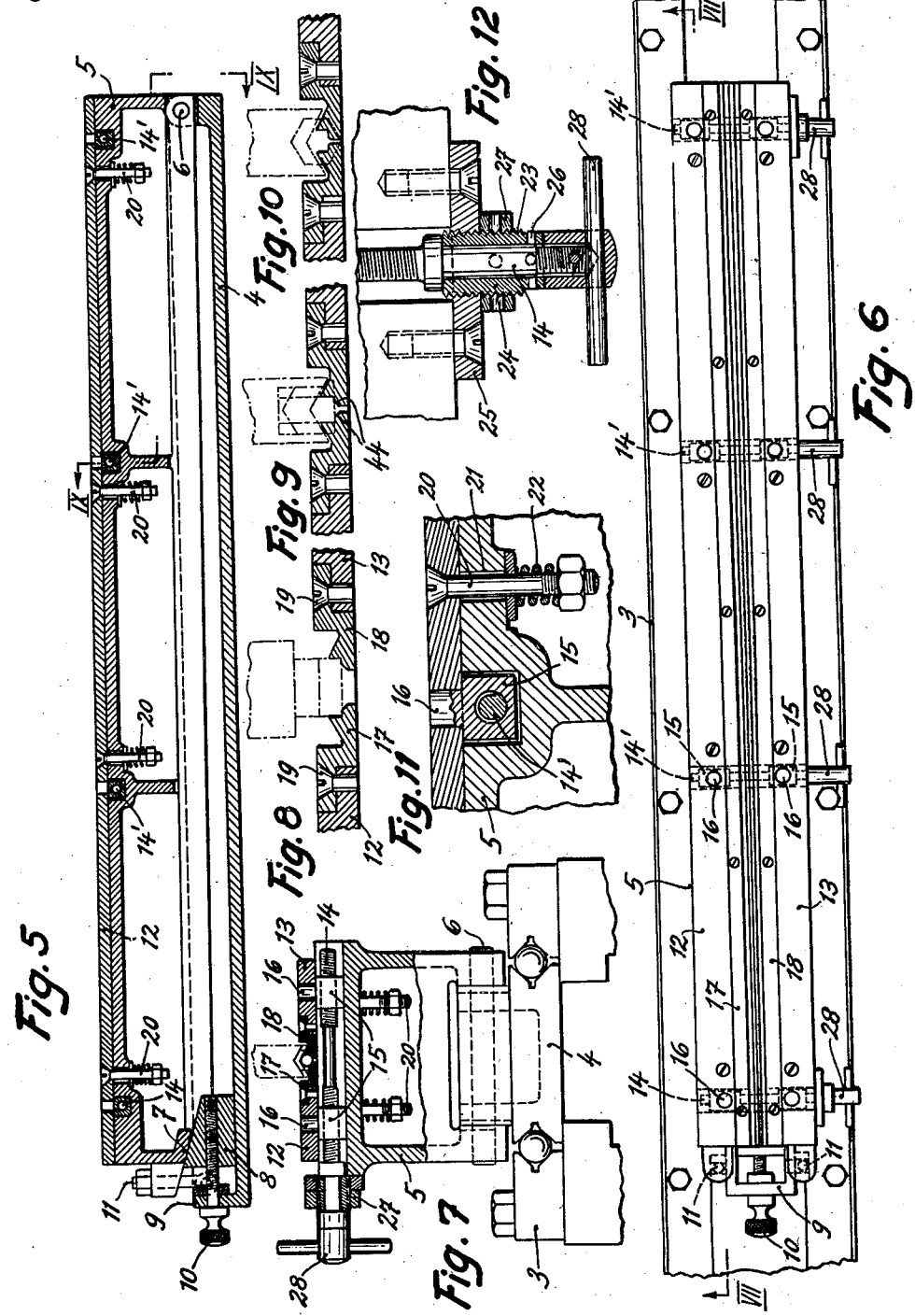
INVENTOR:
Fritz Bänninger Patented Mar. 14, 1950

2,500,735

UNITED STATES PATENT OFFICE 2,500,735

DEVICE FOR HOLDING AND SHAPING LONG TAPERING STOCK

Fritz Bänninger, Zurich, Switzerland

Original application October 26, 1945, Serial No. 624,657. Divided and this application April 4, 1947, Serial No. 739,498

2 Claims. (Cl. 144—125)

The present invention relates to a device for producing wooden rods especially for the manufacture of fishing rods, ski sticks and the like, having a horizontal table, a milling cutter vertically adjustable thereto, a slide movable along said table, a beam-like carrier inclinable lengthwise and fixedly adjustable to various positions, with two clamping strips arranged on said carrier at either side of its longitudinal middle plane for holding the workpiece.

This application is a division of my copending application Serial No. 624,657, filed October 26, 1945.

The accompanying drawing shows a preferred arrangement for shaping the rods.

Fig. 1 is an end elevation of a special milling machine seen in the direction of arrow I indicated in Fig. 2, Fig. 2 represents a side view of the special milling machine, Fig. 3 is a lateral view of a finished wooden rod, Fig. 4 is an enlarged sectional view of the wooden rod seen in the direction of arrow A of Fig. 3, Fig. 5 shows a cross-section through the slide or carriage of the milling machine, taken on the line VII—VII of Fig. 6, Fig. 6 is a top view of the carriage shown in Fig. 5, Fig. 7 is an enlarged cross section of the carriage, taken on the line IX—IX of Fig. 5, Figs. 8, 9, 10 show three stages in the profiling of the wooden rods, Fig. 11 is an enlarged detail section of Fig. 5, Fig. 12 is an enlarged detail section of Fig. 6.

Referring to the annexed drawings, numeral 1 designates the column of a special milling machine having arranged thereon a horizontal table 2 with a saddle 3 in which, parallel therewith, a slide or carriage 4 is supported being movable in longitudinal direction of the table 2 and adapted to serve as support for a beam-shaped carrier 5 which at one end is oscillatable in a perpendicular plane about a horizontal pivot 6 on slide 4. At the opposite end the carrier 5 has an inclination 7 resting on a wedge 8. The latter can be displaced in longitudinal direction of the slide 4 by means of a screw spindle 10 anchored in a flange 9 of said slide to enable raising and lowering of the left side extremity of the carrier 5 shown in Fig. 5. The latter can be fastened in any position of the slide 4 by means of two screws 11, the inclined portion 7 of carrier 5 being thereby pressed against the wedge 8. The two clamping strips 12 and 13, respectively, are arranged on carrier 5 at either side of the longitudinal middle plane (Fig. 6). At various points of the carrier 5 and crosswise to it, screw spindles 14, 14' having right- and left-handed threads are disposed, each of them engaging two nuts 15 provided with studs 16 which enter bores in the clamping strips 12, 13. The nuts of spindle 14 are so dimensioned as to be guided with slide fit in a recess of carrier 5 which receives the threaded spindle. On all other spindles 14', however, the nuts 15 are located with a certain lateral clearance in their appropriate recesses of carrier 5. Onto the sides of the clamping strips 12, 13 facing each other, holding strips 17 and 18 (Figs. 8-10) are detachably fixed by screws 19. Bolts 20 (Fig. 11) are anchored to the clamping strips 12, 13 and guided in slots 21 of carrier 5, each of them carrying at its lower end a compression spring 22 which tends to urge downwards the bolts for fitting the clamping strips 12, 13 to the surface of slide 4.

The laterally outstanding ends of the spindles 14 engage each an externally threaded (23) sleeve 24 (Fig. 12) in which the spindle is revolubly supported. The sleeve 24 is seated in a threaded bore of a plate 25 screwed fast to carrier 5 and has at its outer end the radial bores 26 for receiving a bar serving as key by means of which the sleeve 24 can be screwed forwards or backwards according to the rotary direction. In the desired position the threaded sleeve 24 can be secured by a lock-nut 27. This arrangement enables a displacement of the whole spindle 14 together with nuts 15 and clamping strips 12, 13 across the carrier 5 to align them with the perpendicular middle plane of the milling cutter. By turning the handles 28 on spindles 14, the clamping strips 12, 13 can either be moved towards each other or spaced apart according to the rotary direction.

Numeral 29 (Figs. 1 and 2) marks a support with a perpendicular saddle 30 arranged on table 2 of the milling machine. On this saddle a slide 31 is mounted being vertically displaceable by handwheel 32 with respect to the plane of table 2. In slide 31 a horizontal arbor 33 is journaled which at one end carries a milling cutter 34, while the other end is over belt 35 in driving connection with an electric motor 36. In the milling plane, to the right and left of the cutter, resilient pressure rollers 37, 38 are arranged to urge the workpiece fed thereunder against the clamping strips 12, 13 or holding strips 17, 18.

The manufacture of conical hexagonal rods suitable for making fishing-rods is as follows. As may be seen from Fig. 4, by dash-and-dots, a crude square wooden rod is used.

The work is at first, as visible in Fig. 8, placed between the clamping strips 12, 13, and fixed between the holding strips 17, 18 by tightening the screw spindles 14, 14'. By adjustment of the screw spindle 10 and shifting of the wedge 8 the carrier is subsequently brought to a position which corresponds to the required conicality. A plain milling cutter is mounted on arbor 33 as indicated in Fig. 1. By operating the handwheel 32 the cutter is brought to the proper adjustment over the workpiece, whereupon the electric motor 36 is switched on. The slide 4 together with carrier 5, clamping strips 12, 13 and the fixed workpiece is fed under the cutter in the direction of arrow I (see Fig. 2). During this first stage the workpiece is given the sectional form of a square wedge. The slide is then returned to its starting position and upon slackening the spindles 14 and 14' the workpiece is removed from the holding strips 17, 18, turned 90° about its longitudinal axis, and in this position again inserted between the holding strips 17, 18 as indicated by dash-and-dot lines in Fig. 9. Now the plain cutter used at first is replaced by a sectional cutter having on its contour a V-shaped groove whose faces enclose an angle of 120°. The cutter is adjusted to the proper height relative to the workpiece, which is again fed thereunder in the direction of arrow I indicated in Fig. 2, whereby the top side of the wooden workpiece is profiled to the hexagonal shape as shown by dash-and-dots in Fig. 9. Upon resetting the slide 4 to its starting position, the holding strips 17, 18 are loosened from the workpiece by turning the spindles 14 and 14'. The workpiece is again taken out from the holding strips 17, 18, turned 180° about its longitudinal axis and replaced between the holding strips 17, 18 with the profiled face turned downwards. Thereby the workpiece rests with its two profiled faces on shoulders 44 (Fig. 9) extending along the holding strips. After having thus set the workpiece between the holding strips, it is again clamped by turning the screw spindles 14, 14'. Upon readjustment of the height of the cutter above the workpiece and of the angle of inclination of the carrier 5, the slide 4 is fed afresh under the cutter, whereby the last face of the workpiece becomes profiled as shown by dash-and-dots in Fig. 10.

What I claim is:

1. The improvement comprising a reciprocable clamping device adapted in association with a vertically adjustable cutting head for producing longitudinally tapered wooden rods such as ski sticks, fishing rods and the like, which rods are polygonal in cross section, which device comprises in combination: a generally horizontal guideway; a longitudinally reciprocable slide disposed in said guideway in operative alignment with the cutting head; a longitudinally split carrier for the wooden rod, hingedly connected to said slide at one end thereof; a longitudinally adjustable, wedge-shaped abutment member mounted between the slide and carrier at their other end, whereby the inclination of the carrier may be set a predetermined amount; means between said split portions of the carrier for detachably engaging varied widths of rods therebetween along their entire length; and other means for adjusting the mutual displacement of the split portions from an axial line and for progressively varying said displacement along the length so as to accommodate a tapered rod, said other means including a plurality of operating spindles provided with right and left hand threads on their respective ends, transversely journaled jointly in said split portions and spaced apart along the longitudinal axis thereof.

2. An article of manufacture of the character described comprising: a longitudinally reciprocal slide adapted to be operated along a guideway in juxtaposition to a cutting head; a longitudinally split carrier for wooden rods, hingedly connected to said slide at one end thereof; a longitudinally adjustable, wedge-shaped abutment member mounted between the slide and carrier at their other end, whereby the inclination of the carrier may be set a predetermined amount; means between said split portions of the carrier for detachably engaging varied widths of rods therebetween along their entire length; and other means for adjusting the mutual displacement of the split portions from an axial line and for progressively varying said displacement along the length so as to accommodate a tapered rod, said other means including a plurality of operating spindles provided with right and left hand threads on their respective ends, transversely journaled jointly in said split portions and spaced apart along the longitudinal axis thereof.

FRITZ BÄNNINGER.

REFERENCES CITED

The following references are of record in the file of this patent:

UNITED STATES PATENTS

| Number | Name | Date |
| --- | --- | --- |
| 893,218 | Zahnter | July 14, 1908 |
| 1,008,926 | Saylor | Nov. 14, 1911 |
| 1,440,388 | Jeffrey | Jan. 2, 1923 |
| 1,471,118 | Gething | Oct. 16, 1923 |

FOREIGN PATENTS

| Number | Country | Date |
| --- | --- | --- |
| 9,188 | Great Britain | Oct. 19, 1909 |